United States Patent [19]

Andrews et al.

[11] Patent Number: 5,344,084

[45] Date of Patent: Sep. 6, 1994

[54] WATERING SYSTEM FOR CONNECTION TO A WATER SUPPLY AND AN ELECTRICAL SUPPLY FOR USE IN WATERING PLANTS AND THE LIKE

[75] Inventors: F. Keith Andrews, Waterford; Richard R. Ryszanek, Kitchener, both of Canada

[73] Assignee: ANDPRO Ltd., Waterford, Canada

[21] Appl. No.: 2,965

[22] Filed: Jan. 11, 1993

[51] Int. Cl.$^5$ .............................. A01G 25/09
[52] U.S. Cl. .................... 239/751; 239/752; 137/355.16
[58] Field of Search ............... 239/750, 751, 752, 753; 104/89; 105/148; 47/17 R; 137/899.1, 355.16, 355.2

[56] References Cited

U.S. PATENT DOCUMENTS

| | | | |
|---|---|---|---|
| 2,556,428 | 6/1951 | Kooken | 104/89 |
| 2,935,080 | 5/1960 | Klimek | 137/899.1 |
| 4,074,856 | 2/1978 | Williams et al. | 47/17 R |
| 4,723,714 | 2/1988 | Lucas | 239/751 |
| 4,842,204 | 6/1989 | Debruhl, Jr. | 239/751 |
| 4,928,889 | 5/1990 | Lucas | 137/355.16 |

FOREIGN PATENT DOCUMENTS

| | | | |
|---|---|---|---|
| 837938 | 3/1952 | Fed. Rep. of Germany | 239/751 |
| 2158335 | 11/1985 | United Kingdom | 239/751 |

Primary Examiner—Andres Kashnikow
Assistant Examiner—Christopher G. Trainor
Attorney, Agent, or Firm—Daryl W. Schnurr

[57] ABSTRACT

A watering system for use in a greenhouse has a hose carrier that is supported entirely on a single track, the track having a rectangular cross-section. The hose carrier is connected by a cable that winds through a series of pulleys to a drive system so that the carrier moves at one-half the speed of the drive system as the drive system moves along the track in either direction. The water supply and electrical supply are connected at the approximate mid-point of the track and the hose carrier distributes the hose and electrical conductor among support brackets located along the track so that neither the hose nor the conductor become tangled. The tension on the hose and conductor is minimal as each support bracket has rollers thereon and the hose and/or conductor are not used to apply force to the hose carrier to move it along the track. The support brackets on one half of the track can be much smaller than the support brackets on the other half of the track as the hose carrier travels on one-half of the track only. Previous systems have used double tracks, which are more complex and more expensive. Also, it is much more difficult to move a watering system from one track to another track when the track is double than it is when the track is single.

11 Claims, 7 Drawing Sheets

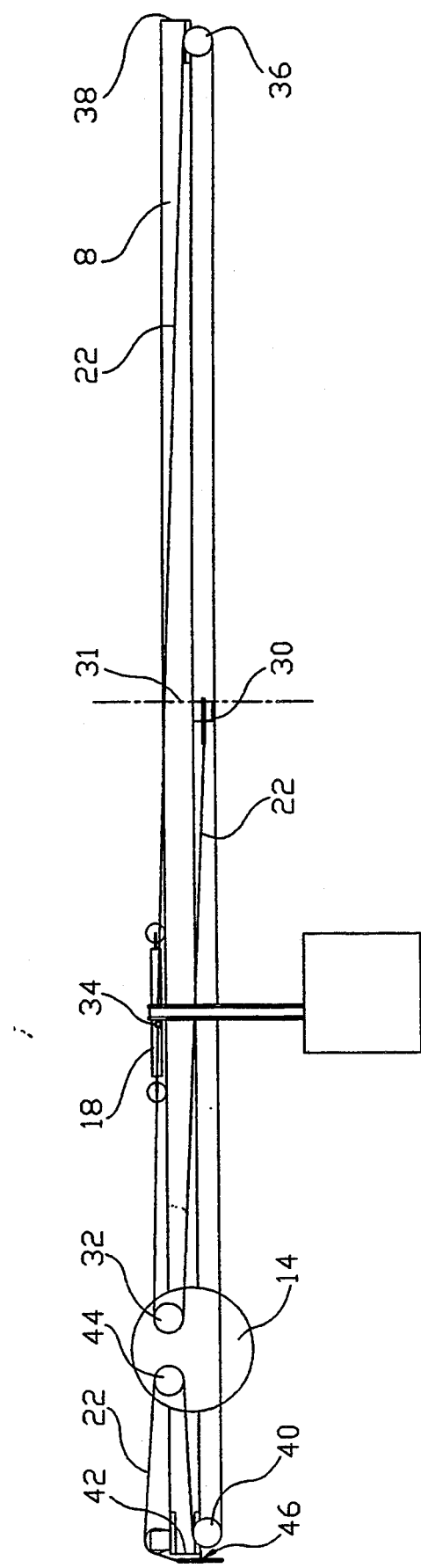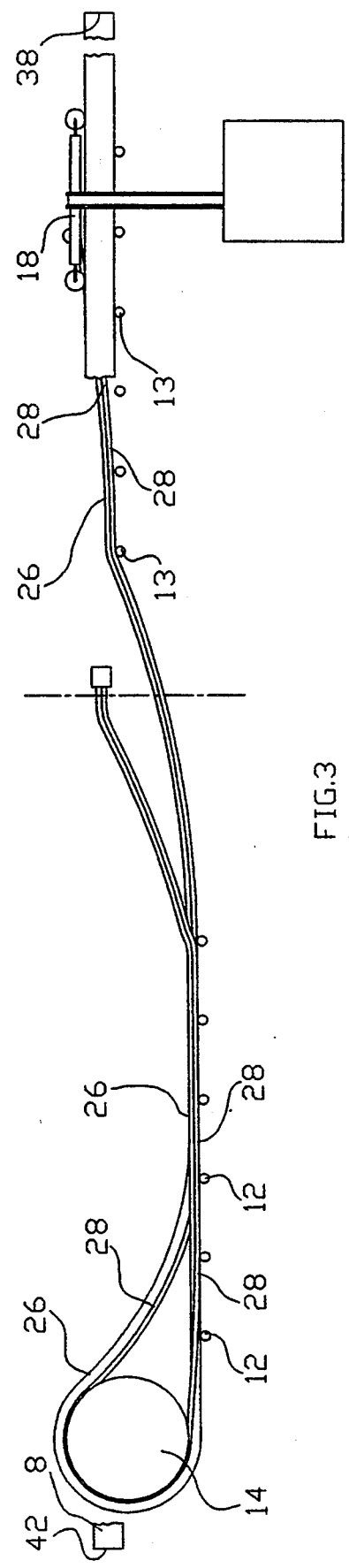

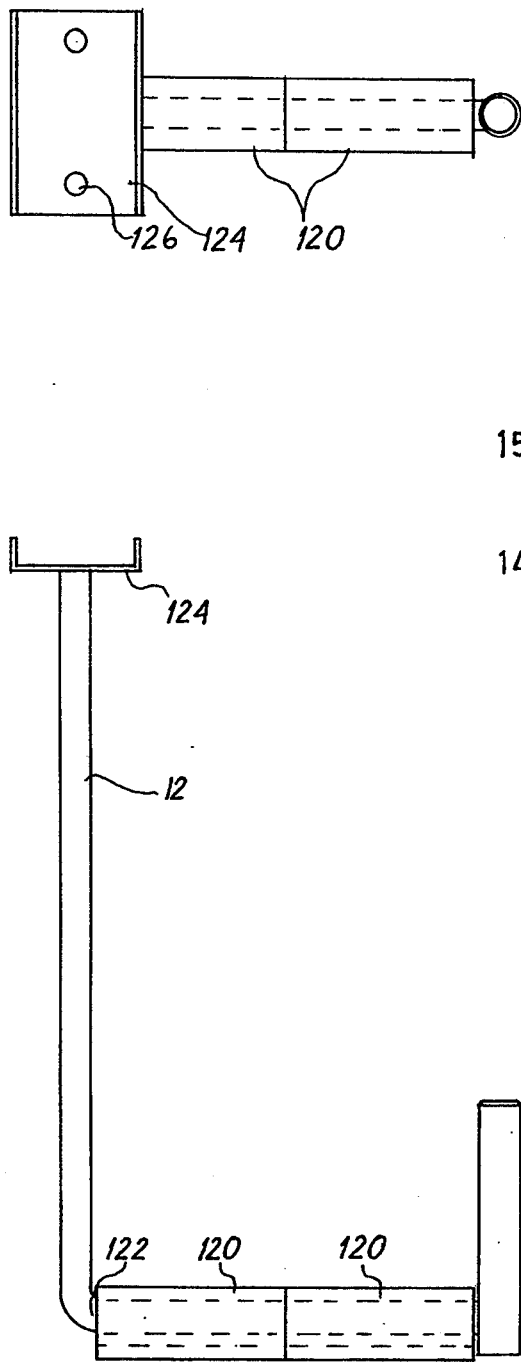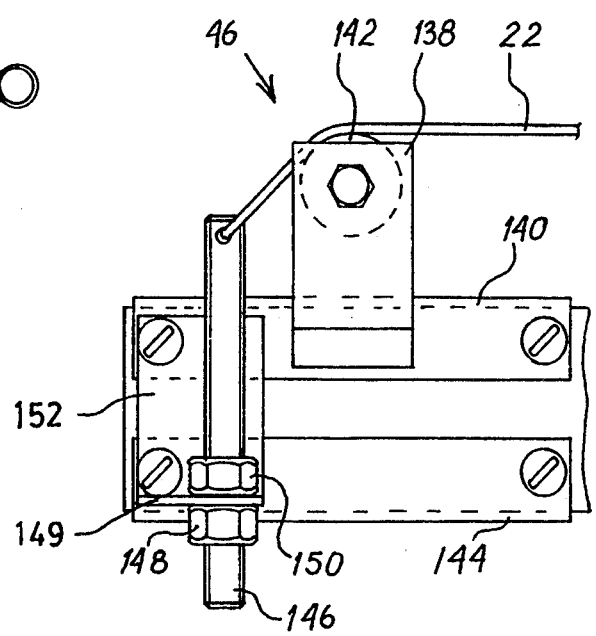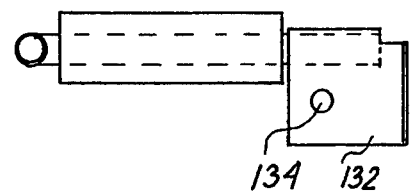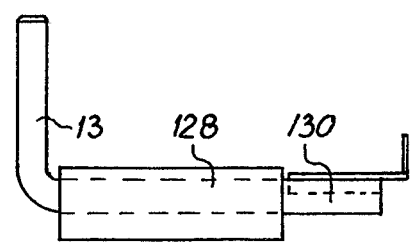

WATERING SYSTEM FOR CONNECTION TO A WATER SUPPLY AND AN ELECTRICAL SUPPLY FOR USE IN WATERING PLANTS AND THE LIKE

BACKGROUND OF THE INVENTION

1. Field of the Invention

This invention relates to a watering system for connection to a water supply and an electrical supply for use in watering plants and the like located within an area to be watered and, more particularly, to a watering system that proceeds automatically along an elevated track with the electrical supply connection and water supply connection located at an approximate mid-point of said track.

2. Description of the Prior Art

Watering systems for greenhouses and the like are known and one such system is described in the U.S. Lucas Pat. No. 4,928,889 issued May 29th, 1990. The Lucas patent describes a sprinkler watering system where two horizontal rails extend parallel to one another in a greenhouse. A hose car and a carriage are movably mounted on the rails and a fluid outlet is disposed at substantially a midway point along the path. Tension is maintained on the hose and a cable is connected to the hose car to exert a force along the path directly opposed to the force exerted on the hose car by the hose. The electrical line for supplying electrical power to the carriage is connected to extend longitudinally within the hose. The watering system described in the Lucas patent can be disadvantageous as a double rail rather than a single rail is required, tension exerted on the hose can unreasonably diminish the lifetime of the hose or it can cause premature leakage. In addition, the double track is more expensive than a single track and is more difficult to design and install, particularly, when it contains one or more curves. Also, it can be unsafe to extend an electrical line inside a hose which is used to transfer water. If the electrical line is not properly insulated and waterproofed, short circuiting will occur.

SUMMARY OF THE INVENTION

It is an object of the present invention to provide a watering system that is an improvement over the system described in the Lucas patent in that the hose carrier is supported entirely on a single track, force is not exerted on the hose to move the hose carrier relative to drive means and an electrical conductor is separate from the hose.

A watering system for connection to a water supply and electrical supply for use in watering plants and the like located in an area to be watered has:

(a) a substantially horizontal single track extending within said area to be watered, said track being supported at a fixed elevation, said track having brackets for a flexible hose and electrical conductor mounted along said track;

(b) a hose carrier movably supported entirely on said single track, said carrier having distribution means for said hose and conductor thereon;

(c) an electrically powered drive system movably supported on said track, said drive system having propulsion means thereon to move said drive system in either direction along said track, said hose carrier being connected by a cable to said drive system so that as said drive system moves, the carrier moves simultaneously in the same direction as the drive system but at one-half of the velocity of said drive system;

(d) spraying means on said drive system and control means to spray water as said drive system moves along said track;

(e) a water outlet and an electrical outlet located substantially at a mid-point along said track;

(f) said flexible hose extending from said water outlet to said distribution means on said carrier and to said drive system, said electrical conductor extending from said electrical outlet to said distribution means on said carrier and to said drive system to power said propulsion means, said conductor extending adjacent to said hose, said distribution means placing said hose and said conductor on said brackets as said drive means moves along said track from one end to the other and vice-versa, the carrier being located substantially at the mid-point when the drive is at one end and substantially at an opposite end when the drive is at said opposite end, said hose and said conductor always being substantially fully extended but not being used to move said hose carrier relative to said drive system.

BRIEF DESCRIPTION OF THE DRAWINGS

FIG. 2 is a schematic partial side view of said system showing a cable connection between a drive system and a hose carrier;

FIG. 3 is a schematic partial side view of said system showing hose and conductor locations;

FIG. 8 is a an enlarged front view of a long bracket to support a hose and electrical conductor;

FIG. 9 is a top view of the bracket of FIG. 8;

FIG. 10 is an enlarged front view of a short bracket to support said hose and conductor;

FIG. 11 is a top view of the short bracket of FIG. 10; and

FIG. 12 is a side view of a cable tensioner.

DESCRIPTION OF A PREFERRED EMBODIMENT

Figure 1:
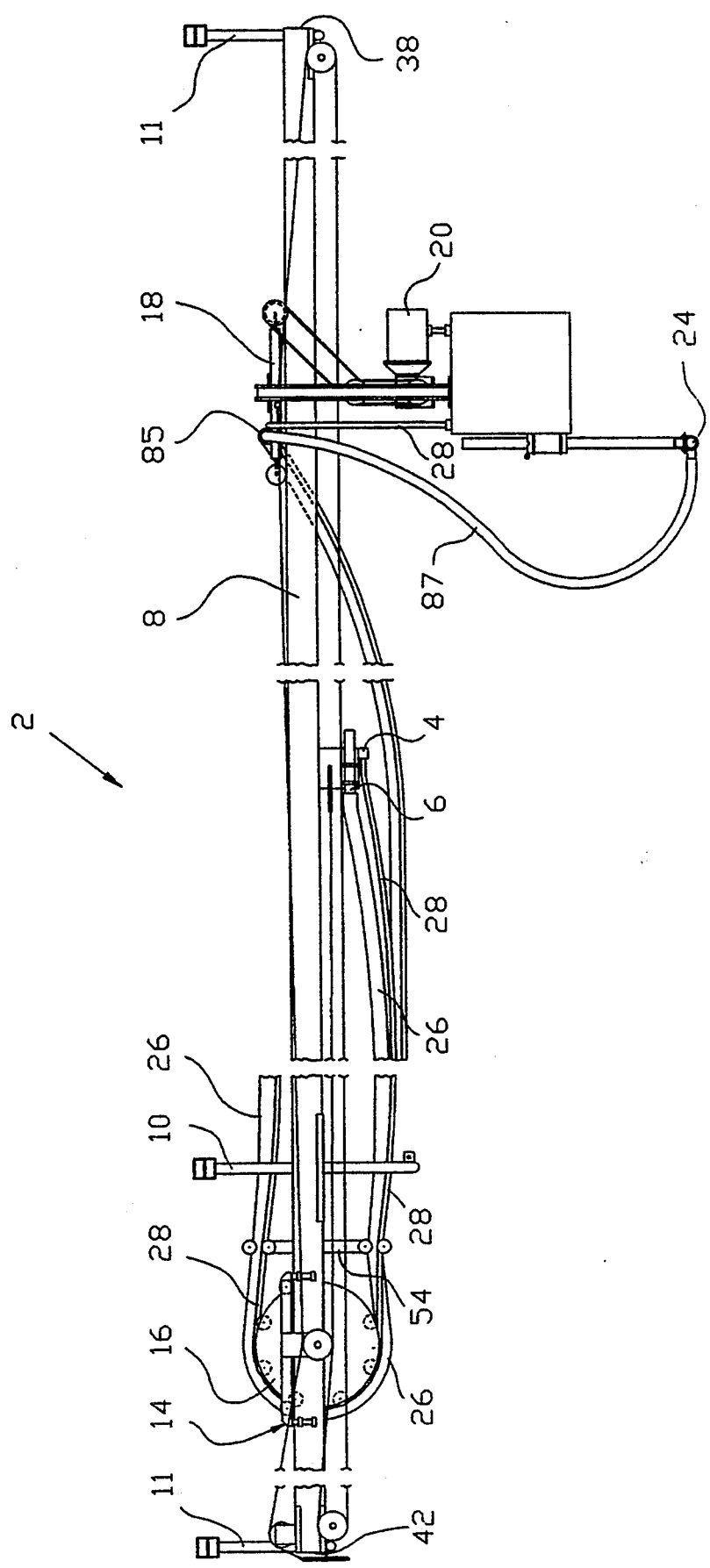
FIG. 1 is a side view of a watering system.

Referring to the drawings in greater detail, in FIGS. 1, 2 and 3, it can be seen that a watering system 2 for connection to a water supply 4 and electrical outlet 6 has a horizontal single track 8. The track is supported at a fixed elevation by track supports 10 which are spaced substantially equally along said track (only one track support 10 is shown in FIG. 1). Two track supports 11 at either end of the track 8 are L-shaped and much shorter than the supports 10. Mounted on said track are a plurality of long brackets 12 and short brackets 13 that contain first rollers (not shown in FIGS. 1, 2 and 3). From FIG. 3, it can be seen that the long brackets 12 are located on that portion of the track 8 where a hose carrier 14 travels and the short brackets are located along that portion of the track 8 where the hose carrier 14 does not travel. The long brackets could be used along the entire track and the short brackets could be eliminated. However, the arrangement and use of the long and short brackets as shown in FIG. 3 is the preferred arrangement.

The hose carrier 14 is movably supported entirely on said track 8, said carrier 14 having distribution means 16 thereon. An electrically powered drive system 18 is movably supported on said track 8. The drive system 18 has propulsion means 20 thereon to move said drive system in either direction along said track 8.

As can best be seen from FIG. 2, the hose carrier 14 is connected by a cable 22 to said drive system 18 so that, as said drive system moves, the carrier moves simultaneously in the same direction as the drive system but at one-half of the velocity of said drive system. There are spraying means 24 mounted on said drive system to spray water (not shown in FIGS. 1, 2 and 3). Preferably, the spraying means is a spray boom 24.

A flexible hose 26 extends from said water outlet 4 to said distribution means 16 on said hose carrier 14 and to said drive system 18 so water can be supplied to said spraying means. An electrical conductor 28 extends from said electrical outlet 6 to said distribution means 16 on said hose carrier 14 and to said drive system 18 to power said propulsion means. The conductor 28 extends adjacent to said hose 26. The conductor 28 is represented by a single line in FIG. 1 because it is small relative to the size of the hose. In a side view, the conductor 28 would usually be hidden from view by the hose 26 as it extends parallel to said hose. In FIGS. 1 and 3, the conductor 28 is specifically shown as being adjacent to the hose 26 for ease of illustation. In FIG. 3, the conductor 28 is most often shown with a double line.

Referring to FIG. 2, there is shown a schematic side view of the watering system showing the manner in which the cable 22 is connected. One end of the cable 22 is affixed to a first cable tensioner 30 located at substantially a mid-point 31 of said track 8. From there, the cable extends around a first pulley 32 rotatably mounted on the hose carrier 14 and then to an attachment point 34 on said drive system 18 and continuing to a second pulley 36 located at an end 38 of the track 8. From the second pulley 36, the cable 22 extends to a third pulley 40 located at an end 42 of said track (opposite to said end 38). From the third pulley 40, the cable 22 extends to a fourth pulley 44 rotatably mounted on the hose carrier 14 and then back to a second tensioner 46 located at the end 42.

From FIG. 2, it can be seen that as the drive system 18 moves along the track 8 towards the end 38, the hose carrier 14 is pulled along by the cable 22, also towards the end 38, at half the velocity of the drive system. Since the drive system travels at twice the speed of the hose carrier, when the drive system is located at or near the end 38, the hose carrier will be located at or near the mid-point 31 (represented by the dotted line in FIGS. 2 and 3) of the track. Further, it can be seen that as the drive system 18 moves along the track 8 towards the end 42 of the track 8, the cable 22 pulls the hose carrier 14 towards the end 42 at half the velocity of the drive system 18. Near the end 42, the drive system 18 and the hose carrier 14 will be immediately adjacent to one another. The hose carrier 14 will travel along the track between the end 42 and the mid-point 31 while the drive system travels along the entire track between the ends 38, 42. While one cable is shown in FIG. 2, the same result could be achieved using an arrangement of two cables. It can also be seen that the tension on the hose and on the conductor is kept to a minimum as the cable 22 moves the carrier along the track, not the hose and/or the conductor.

From FIG. 3, it can be seen that the hose 26 and conductor 28 are supported by long brackets 12 between the end 42 and the mid-point 31 and by the short brackets 13 between the mid-point 31 and the end 38.

Figure 4:
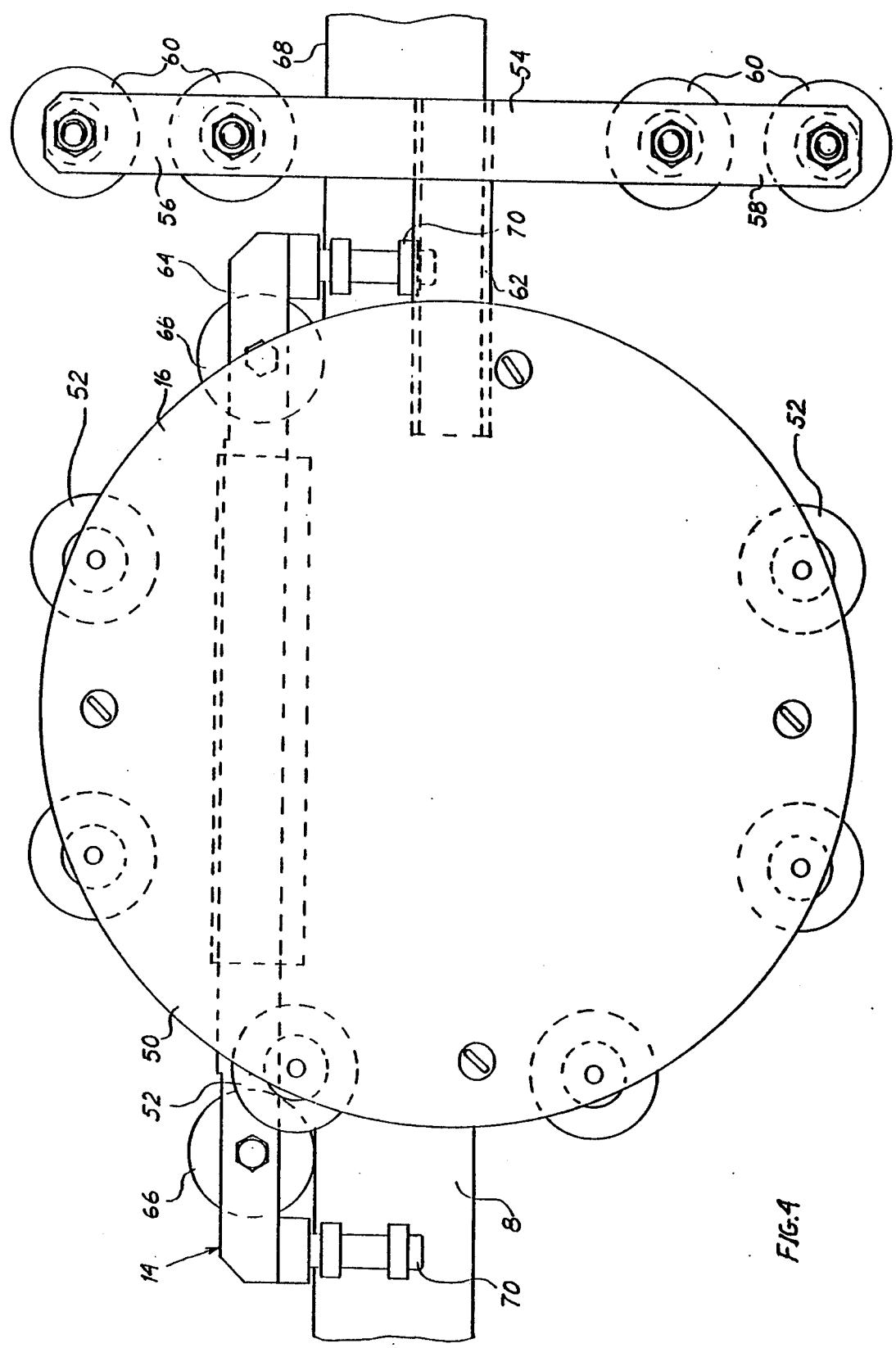
FIG. 4 is an enlarged side view of a hose carrier.
Figure 5:
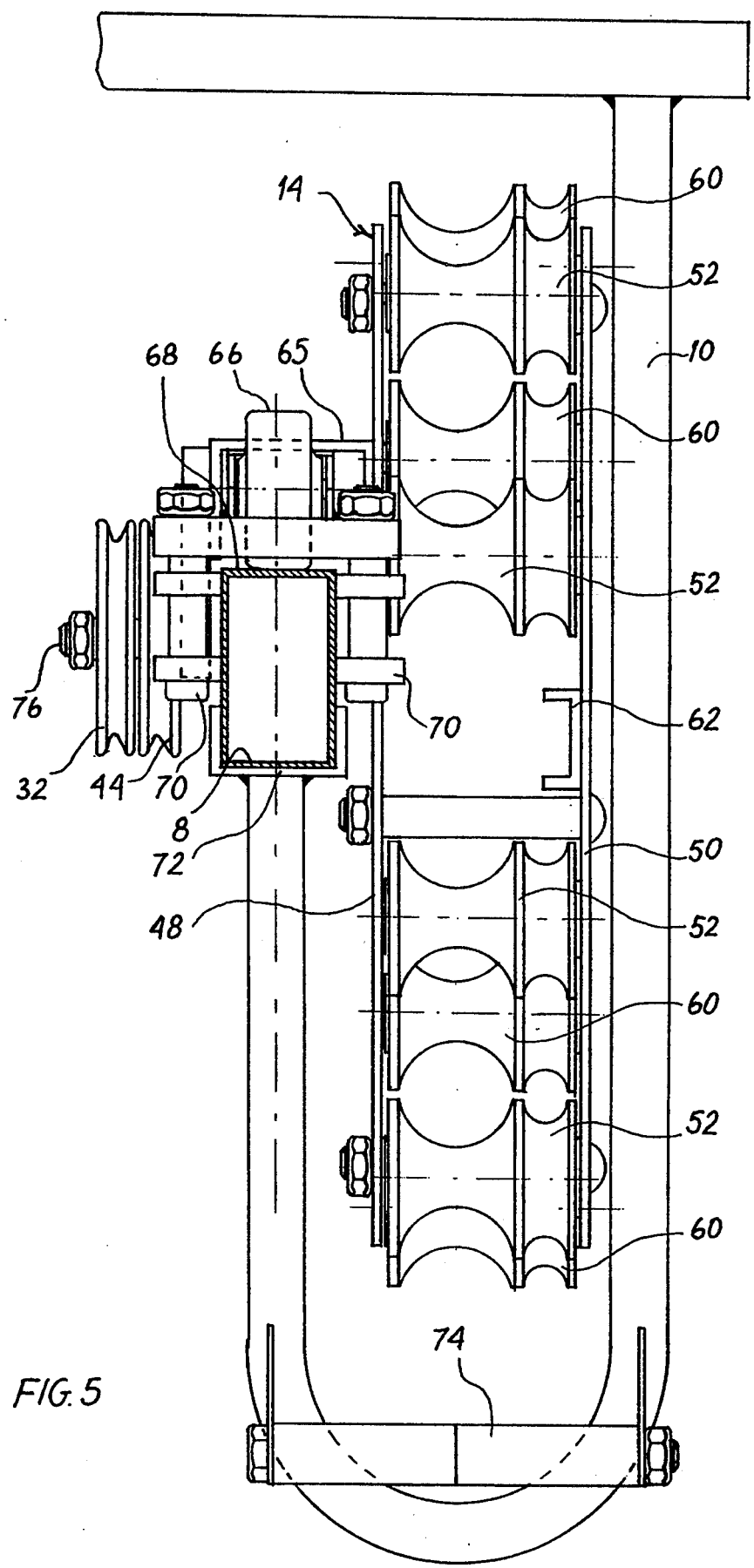
FIG. 5 is an enlarged end view of said hose carrier.

Referring to FIGS. 4 and 5, it can be seen that the distribution means 16 on the hose carrier 14 supports the hose 26 and conductor 28 in a substantially semi-circular configuration in a vertical plane or substantially a vertical plane. The distribution means 16 has two circular walls 48, 50 that are spaced apart from one another with a series of spaced second rollers 52 arranged in a generally semi-circular configuration. As can be seen, the hose 26 (not shown in FIGS. 4 and 5) extends from the water supply 4 (not shown in FIGS. 4 and 5) through a guide means 54, located immediately adjacent to the carrier 14, around the distribution means 16 and back through the guide means 54. The guide means 54 has an upper end 56 and a lower end 58 with two rotatable third rollers 60 at each end. The third rollers 60 are double rollers (similar to the second rollers 52) and have a large portion designed to receive the hose 26 and a smaller portion designed to receive the conductor 28. The guide means 54 is affixed to the carrier 14 by a bracket 62 extending from the guide means 54 to the wall 50. The bracket can be affixed by various means including welding. The purpose of the guide means 54 is to ensure that the hose and conductor are maintained in a generally semi-circular shape around the distribution means 16 in contact with the second rollers 52. The two ends 56, 58 of the guide means 54 are mirror images of one another. As the hose carrier moves toward the end 38 along the track 8, the hose 26 and conductor 28 will move around the distribution means 16 in a clockwise direction when viewed as shown in FIG. 3. Alternatively, when the hose carrier 14 moves toward the end 42 of the track 8, the hose 26 and conductor 28 will move around the distribution means 16 in a counterclockwise direction.

From FIG. 5, it can be seen that the track 8 has a rectangular cross-section. The purpose of the rectangular cross-section is to prevent the drive system from rotating in a vertical plane relative to said track. Any non-circular track will accomplish this purpose. Alternatively, a circular track could be utilized with a channel or other means to prevent rotation. While the distribution means 16 is designed to contain a number of second rollers 52, the distribution means could be designed so that the circular walls 48, 50 are pivoted at the center and the entire walls are rotated as the hose and conductor is moved in either direction. In this embodiment, the guide means would have to be affixed to a fixed point on the carrier 14 rather than to the wall 50, which would be movable. It can be seen that the hose carrier 14 has a frame 64 which extends from side to side of the carrier 14 and supports two wheels 66 that are rotatable on an upper surface 68 of the track 8. A bracket 65 connects the wall 48 to the pulleys 32, 44. Guide means 70 extend from either end of the frame 62 down each side of the track 8 to maintain the carrier 14 in a stable position relative to the track so that the distribution means 16 lies substantially in a vertical plane. The guide means has bearings mounted on a bolt with spacers in between. For very large watering systems, the drive system can be designed to be supported by a double track but the hose carrier will always be supported only by a single track.

In FIG. 5, a track support 10 is shown supporting the track 8. Usually, an upper end (not shown) of the support 10 would be affixed to a ceiling support (not shown). The support 10 is affixed to a lower portion of the track 8 by bolts (not shown) extending through a plate 72. The support 10 has a U-shaped portion with fourth rollers 74 thereon to support the hose 26 and conductor 28. The first pulley 32 and fourth pulley 44, which are shown separately in FIG. 2 for ease of illustration, are mounted on a common pin 76.

Figure 6:
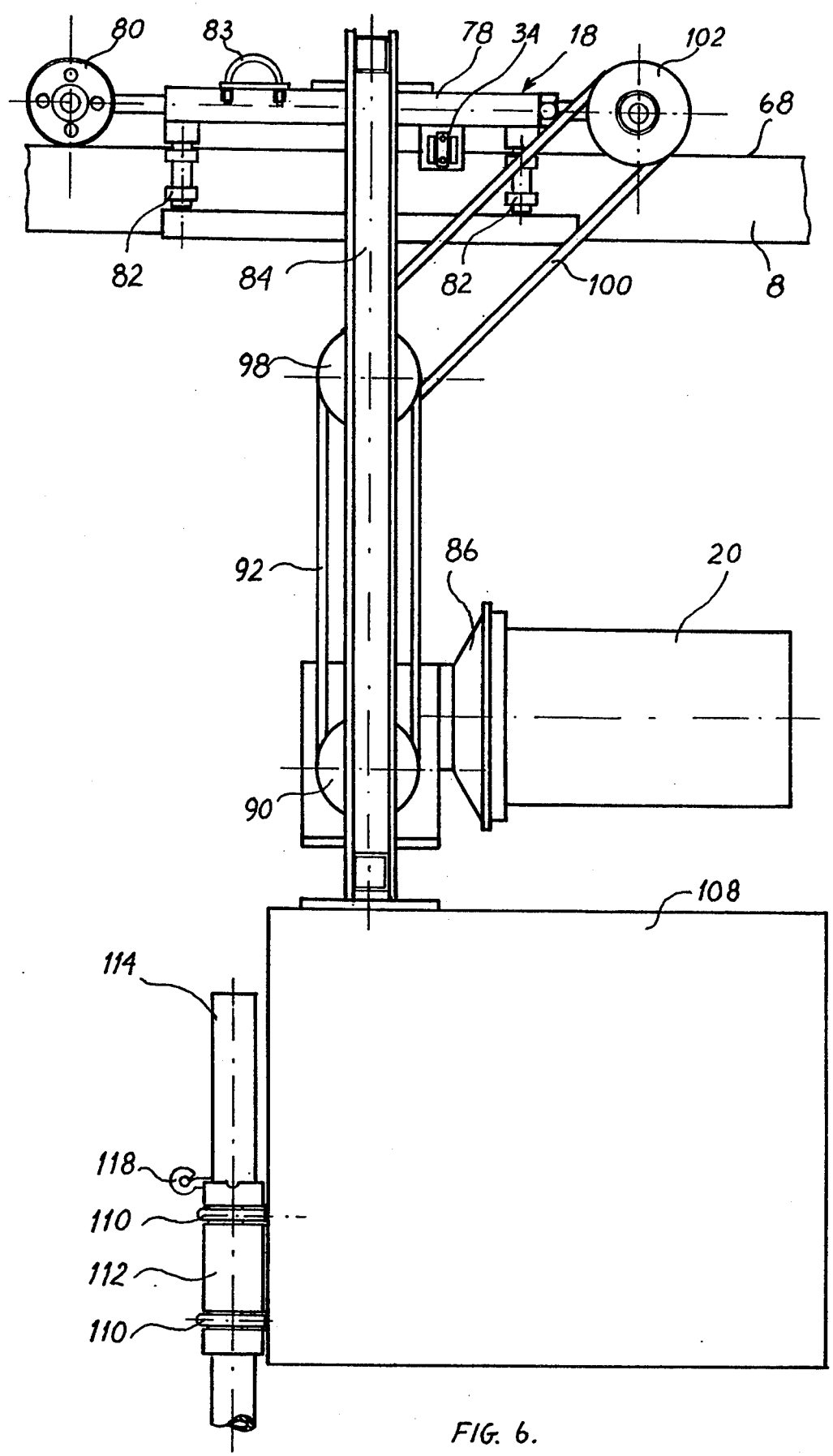
FIG. 6 is an enlarged partial side view of a drive system and spray boom.
Figure 7:
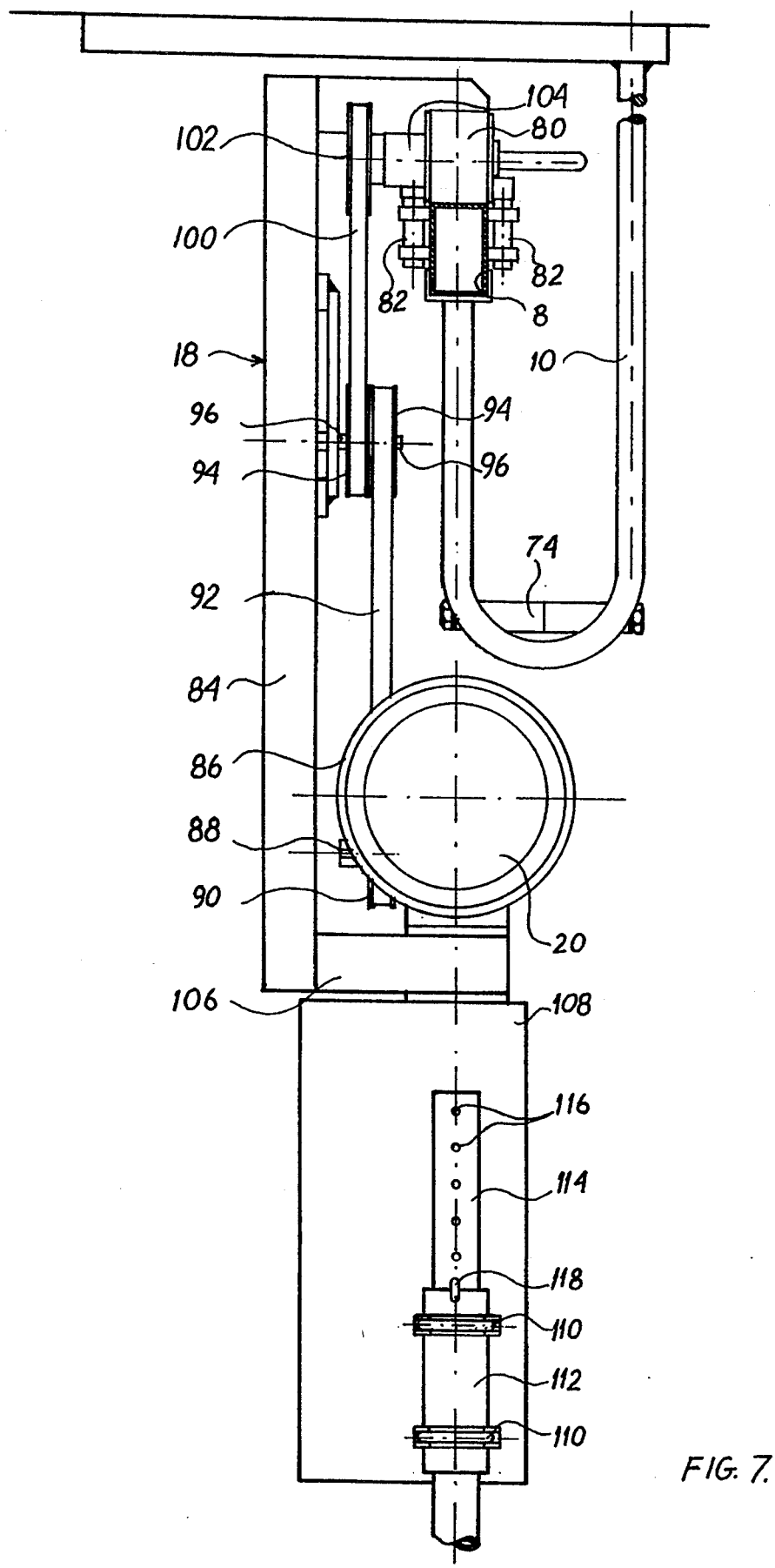
FIG. 7 is an enlarged partial front view of said drive system and spray boom.

In FIGS. 6 and 7, the drive system 18 is shown. It can be seen that the drive system has a frame 78 which extends along the upper surface 68 of the rail 8 with one wheel 80 at each end and guide means 82 extending from the frame 78 down either side of the rail. An L-shaped member 84 is offset from the rail and extends downward to support a spray boom (not shown in FIGS. 6 and 7). The spray boom is conventional and is therefore not described in detail. A clamp 83 holds a hose connector 85 (see FIG. 1) in place. The hose 26 extends from the water supply 4 to the drive system 18. A hose extension 87 extends from the connector 85 to the boom 24 (see FIG. 1). A motor 20 mounted on the L-shaped member 84 is the propulsion means for the drive system 18 and is connected to the conductor 28. The motor 20 has a reducer 86 that is connected to rotate a shaft 88 on which a pulley 90 is fixedly mounted. The pulley 90 is connected by a belt 92 to a double pulley 94 fixedly mounted on a shaft 96. The shaft 96 is rotatably supported by the L-shaped member 84. A belt 100 connects one side of the pulley 94 to a pulley 102 which is fixedly mounted on an extension of an axle 104 connected to one of the wheels 80.

In operation, the motor 20 is reversible to move the drive system 18 in either direction along the track 8. As the motor rotates, the reducer also rotates causing the shaft 88 and the pulley 90 to rotate. The pulley 90 in turn rotates a double pulley 94 and shaft 96 through the belt 92. As the shaft 96 rotates, the pulley 102 rotates through the belt 100. As the pulley 102 rotates, the shaft 104 also rotates, thereby rotating the wheel 80. Through a lower end 106 of the L-shaped member 84, there is connected a control box 108. The control box 108 houses the controls for the watering system to activate and de-activate the spray boom, to move the drive means along the track in either direction, to shut the system down and to control the speed of the drive system. Affixed to the control box 108 by clamps 110 is a sleeve 112 which is sized to surround a boom support 114. The boom support has a series of openings 116 therein so that the boom support 114 can be moved upward and downward by removing a pin 118, lowering or raising the boom support 114 and reinserting the pin 118 into a different opening 116 then previously. The boom (not shown in FIGS. 6 and 7) can thus be raised or lowered relative to the plants being watered. Also, the boom can be rotated relative to the drive system 18 to avoid obstructions when the drive system 18 is moved from one track to another.

In FIGS. 8 and 9, there is shown a front view and top view respectively of one of long brackets 12. It can be seen that the brackets 12 are L-shaped with first rollers 120 mounted on a base 122 thereof. A top 124 is formed into a U-shaped channel with openings 126 therein to affix the bracket to a lower portion of the track 8.

In FIGS. 10 and 11, a short bracket 13 is shown. The short bracket is also L-shaped and has rollers 128 mounted on a base 130 thereof. A plate 132 has an opening 134 for affixing each short bracket 13 to a lower portion of the track 8. As can be seen from FIG. 3, the long brackets 12 are utilized in that portion of the track 8 where the hose carrier 14 travels and the short brackets 13 are utilized in that portion of the track 8 where the hose carrier 14 does not travel. The long brackets 12 could be used throughout the track bit must be used where the hose carrier travels to accommodate the vertical depth of the distribution means 16.

In FIG. 12, there is shown a cable tensioner 46 which is used to maintain sufficient tension on the cable 22. The cable tensioner 46 is located at the end 42 of the track in FIG. 1. The tensioner 46 has a bracket 138 mounted on a base 140. Within the bracket 138 is a pulley 142. A plate 144 is fixedly mounted on a lower side of the track 8. In FIG. 1, this plate is located at each end of the track 8 and is welded to the support 11. A threaded bolt 146 having a nut 148 located below a flange 149 and a nut 150 located below said flange 149 extends through said flange. The flange 149 is welded to a vertical plate 152. One end of the bolt 146 is attached to the cable 22. The tension in the cable 22 can be increased by turning the nuts 148, 150 to lower the bolt in the flange 149. Two nuts 148, 150 are used to lock the bolt in position. By loosening the nuts 148, 150, the tension on the cable can be reduced. The tensioner 30 shown in FIG. 2 is similar, though not identical to the tensioner 46 and operates in a similar fashion. The tensioner 30 is considered to be conventional and is, therefore, not further discussed.

What we claim as our invention is:

1. A watering system for connection to a water supply and electrical supply for use in watering plants and the like located within an area to be watered, said system comprising:
    (a) a substantially horizontal single track extending within said area to be watered, said track being supported at a fixed elevation, said track having brackets for a flexible hose and electrical conductor mounted along said track;
    (b) a hose carrier movably supported entirely on said single track, said carrier having distribution means for said hose and conductor thereon;
    (c) an electrically powered drive system movably supported on said track, said drive system having propulsion means thereon to move said drive system in either direction along said track, said hose carrier being connected by a cable to said drive system so that as said drive system moves, the carrier moves simultaneously in the same direction as said drive system but at one-half of the velocity of said drive system;
    (d) spraying means on said drive system and control means to spray water as the drive system moves along said track;
    (e) a water outlet and an electrical outlet located substantially at a mid-point along said track;
    (f) said flexible hose extending from said water outlet to said distribution means on said carrier and to said drive system, said electrical conductor extending from said electrical outlet to said distribution means on said carrier and to said drive system to power said propulsion means, said conductor extending adjacent to said hose, said distribution means placing said hose and said conductor on said brackets as said drive means moves along said track from one end to the other end and vice-versa, the carrier being located substantially at the mid-point when the drive is at one end and substantially at an opposite end when the drive is at said opposite end, said hose and said conductor always being substantially fully extended but not being used to move said hose carrier relative to said drive system.

2. A watering system as claimed in claim 1 wherein said distribution means on said carrier supports said hose in a substantially semi-circular configuration, in substantially a vertical plane.

3. A watering system as claimed in claim 2 wherein the hose and conductor are each supported on first rollers on said brackets so that said hose and conductor are always separate but adjacent to one another.

4. A watering system as claimed in claim 3 wherein the distribution means on said carrier is a series of second rollers arranged in an arc shape, each second roller being a double roller with a first portion being sized to support said hose and a second portion being sized to support said conductor.

5. A watering system as claimed in claim 4 wherein the track has a non-circular cross-section so that the carrier and drive system are not rotatable relative to said track.

6. A watering system as claimed in claim 5 wherein the track has a rectangular cross-section.

7. A watering system as claimed in claim 1 wherein there is a single cable extending between said carrier and said drive system and a series of pulleys to move said carrier in either direction along said track in response to movement of said drive system, with tensioners to maintain said cable under tension.

8. A watering system as claimed in claim 7 wherein said cable extends from a first tensioner located substantially at a mid-point on said track to a first pulley on said carrier and back to an attachment point on said drive system, thence continuing on to a second pulley located at one end of said track further from said carrier, thence back to a third pulley at an opposite end of said track nearer to said carrier, thence to a fourth pulley on said carrier and back to a second tensioner located at said opposite end.

9. A watering system as claimed in claim 2 wherein the brackets to support the hose and conductor along the track in a path of travel for said carrier are long brackets and the brackets to support said hose and conductor along the track where said carrier does not travel are short brackets.

10. A watering system as claimed in claim 2 wherein there are guide means affixed to said carrier immediately adjacent to said distribution means to maintain said hose and said conductor in a close relationship with said distribution means.

11. A watering system as claimed in claim 1 wherein there are means to raise and lower said spraying means and to rotate said spraying means relative to said drive system.

* * * * *